(12) United States Patent
Vanderydt et al.

(10) Patent No.: US 10,764,659 B2
(45) Date of Patent: Sep. 1, 2020

(54) COORDINATED AND SCHEDULED STANDARDS-BASED INTERVALS IN NETWORK ELEMENTS

(71) Applicant: Ciena Corporation, Hanover, MD (US)

(72) Inventors: Gregory Vanderydt, Ottawa (CA); Geraldine Ruth Civil, Nepean (CA); Kevin Estabrooks, Nepean (CA); Jeffrey Norman, Kanata (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/654,311

(22) Filed: Oct. 16, 2019

(65) Prior Publication Data

US 2020/0053439 A1 Feb. 13, 2020

Related U.S. Application Data

(63) Continuation of application No. 15/860,898, filed on Jan. 3, 2018, now Pat. No. 10,484,764.

(51) Int. Cl.
*H04J 14/08* (2006.01)
*H04Q 11/00* (2006.01)
*H04L 29/06* (2006.01)
*H04J 3/16* (2006.01)

(52) U.S. Cl.
CPC ........ *H04Q 11/0066* (2013.01); *H04J 3/1652* (2013.01); *H04J 14/08* (2013.01); *H04L 69/18* (2013.01); *H04L 69/28* (2013.01); *H04J 2203/0057* (2013.01); *H04Q 2011/0064* (2013.01); *H04Q 2011/0079* (2013.01)

(58) Field of Classification Search
CPC ........... H04Q 11/0066; H04Q 11/0005; H04Q 2011/0045; H04Q 2011/002; H04Q 11/0068; H04L 69/18; H04J 14/08
See application file for complete search history.

(56) References Cited

U.S. PATENT DOCUMENTS

| | | | |
|---|---|---|---|
| 9,344,323 B2 | 5/2016 | Civil et al. | |
| 2003/0131069 A1* | 7/2003 | Lucovsky | G06F 21/6245 709/217 |
| 2004/0209610 A1* | 10/2004 | Adwankar | H04M 3/42144 455/419 |
| 2005/0058149 A1 | 3/2005 | Howe | |

(Continued)

OTHER PUBLICATIONS

ITU-T, Telecommunication Standardization Sector of ITU, G.8032/Y.1344, Ethernet ring protection switching, Jun. 2008, pp. 1-46.
(Continued)

*Primary Examiner* — Ted M Wang
(74) *Attorney, Agent, or Firm* — Clements Bernard Walker; Lawrence A. Baratta, Jr.; Christopher L. Bernard

(57) ABSTRACT

Systems and methods include, for a plurality of services operating on a plurality of network elements in a network, determining attributes for one or more events that periodically occur; and providing a configuration based on the determined attributes to the plurality of network elements for configuring the associated network elements, wherein the configuration controls and coordinates when actions associated with the one or more events occur, across the plurality of network elements and across one or more protocol layers.

20 Claims, 3 Drawing Sheets

(56) References Cited

U.S. PATENT DOCUMENTS

2008/0212591 A1* 9/2008 Wu .................. H04L 47/724
  370/395.21
2015/0244470 A1* 8/2015 Chhillar ................ H04B 10/70
  398/5

OTHER PUBLICATIONS

ITU-T, Telecommunication Standardization Sector of ITU, G.8032/Y.1344, Ethernet ring protection switching, Mar. 2010, pp. 1-98.
P. Pan et al., Network Working Group, Fast Reroute Extensions to RSVP-TE for LSP Tunnels, Standards Track, The Internet Society, May 2005, pp. 1-38.

* cited by examiner

COORDINATED AND SCHEDULED STANDARDS-BASED INTERVALS IN NETWORK ELEMENTS

CROSS-REFERENCE TO RELATED APPLICATION(S)

The present disclosure is a continuation of U.S. patent application Ser. No. 15/860,898, filed Jan. 3, 2018, and entitled "Coordinated and scheduled standards-based intervals in network elements," the contents of which are incorporated herein by reference.

FIELD OF THE DISCLOSURE

The present disclosure generally relates to networking systems and methods. More particularly, the present disclosure relates to systems and methods for coordinated and scheduled standards-based intervals in network elements.

BACKGROUND OF THE DISCLOSURE

Network elements or nodes in data communications networks host a number of running timers for the control of automatic network engineering re-optimization, service resizing, statistics collection, reversion holdoff, and the like in various protocols and at various layers. These timers run independently per service and per node, and these timers are generally not connected, related, coordinated, or scheduled in any way with one another. The corresponding network event or action that occurs upon timer expiry may or may not be service impacting and often triggers protocol re-signaling, can incur performance cost, and/or invokes local software action. The actions are assumed to be statistically distributed across nodes and sparsely triggered. It is further assumed that each action imposes minimal traffic and performance impact to current deployments. Internet Engineering Task Force (IETF), Metro Ethernet Forum (MEF), Institute of Electrical and Electronics Engineers (IEEE), and the International Telecommunication Union Telecommunication (ITU-T) standards do suggest that certain actions should be performed within network operator maintenance windows, but do not suggest a mechanism by which to assure that these actions occur within maintenance windows nor do they suggest how to prevent actions from occurring concurrently in bulk and with consideration for priority\sequence amongst protocols, protocol layers, and nodes within or without a maintenance window. As can be appreciated concurrence can have significant service impact.

BRIEF SUMMARY OF THE DISCLOSURE

There are currently no network element-based scheduling implementations in place to control and coordinate when the actions across multiple nodes and across multiple protocol layers should occur, that take into account the relative priority of events, and that give an operator control over the stagger and execution priority between actions associated with the expiry of standards-based timers where these actions would incur additional traffic, network engineering, or network performance impact.

As large operators seek to consolidate packet, Time Division Multiplexed (TDM) and wireless services over a common packet network, the network size, and service deployment scale drive an increasing proliferation of network events triggered by timers for the control of automatic network engineering re-optimization, re-sizing, reversion, hold off, etc. Unscheduled and uncoordinated, this will trend the probability towards significant network impact by timed events, and can directly impact the quality of experience of the network's end users. The revenue and performance impact of event trigger during peak periods is intuitively greater than that during non-peak hours or were not deferred to within maintenance windows.

In an embodiment, a method of coordinating and scheduling intervals in a network element in a network includes configuring one or more attributes of a plurality of timer-based events at the network element, wherein the plurality of timer-based events include protocol-based actions which are performed responsive to expiry of an associated timer, and wherein the one or more attributes define when the protocol-based actions occur; operating one or more services at one or more protocols; and performing associated protocol-based actions based on the one or more attributes and based on expiry of the associated timer. The one or more protocols can include any of photonic, Optical Transport Network (OTN), Time Division Multiplexed (TDM), and packet protocols. The protocol-based actions can include re-optimization events, resizing events, and reversion events. The one or more attributes can define time of day when the protocol-based actions occur. The one or more attributes can further define event temporal stagger between uncorrelated protocol-based actions between different protocols.

The one or more attributes can constrain an associated protocol-based action unless associated timers have expired for all services with a common group variable and a current time is within the time window within which the associated protocol-based action may occur. The method can further include synchronizing a clock at the network element utilizing a timing synchronization protocol in the network. The one or more attributes can define a grouping of different timers required to expire before an associated protocol-based action can occur. The grouping can further define a stagger time to prevent multiple events occurring concurrently or close to one another. The method can further include triggering one or more of the associated protocol-based actions based on the expiry of the associated timer opportunistically overriding the one or more attributes. The configuring can be via a table including the plurality of timer-based events with associated protocol-based actions and associated one or more attributes. The configuring can be performed by an operator via any of a management system, a control plane, and an orchestrator.

In another embodiment, a network element in a network configured to coordinate and schedule intervals includes one or more ports configured to operate one or more services at one or more protocols; and a controller communicatively coupled to the one or more ports, wherein the controller is configured to configure one or more attributes of a plurality of timer-based events, wherein the plurality of timer-based events include protocol-based actions which are performed responsive to expiry of an associated timer, and wherein the one or more attributes define when the protocol-based actions occur, and cause performance of associated protocol-based actions based on the one or more attributes and based on expiry of the associated timer. The one or more protocols can include any of photonic, Optical Transport Network (OTN), Time Division Multiplexed (TDM), and packet protocols. The protocol-based actions can include re-optimization events, resizing events, and reversion events. The one or more attributes can define time of day when the protocol-based actions occur. The one or more attributes can constrain an associated protocol-based action unless associated timers have expired for all services with a common group variable and a current time is within the time window within which the associated protocol-based action may occur. The one or more attributes can define a grouping of different timers required to expire before an associated protocol-based action can occur. The configuring can be via a table including the plurality of timer-based events with associated protocol-based actions and associated one or more attributes.

In a further embodiment, a management system configured to coordinate and schedule intervals in a network element in a network includes a network interface communicatively coupled to the network element; a processor communicatively coupled to the network interface; and memory storing instructions that, when executed, cause the processor to receive one or more attributes of a plurality of timer-based events at the network element, wherein the plurality of timer-based events include protocol-based actions which are performed responsive to expiry of an associated timer, and wherein the one or more attributes define when the protocol-based actions occur, provide the one or more attributes to the network element, and cause configuration of the network element for operation of one or more services at one or more protocols and for performance of associated protocol-based actions based on the one or more attributes and based on expiry of the associated timer.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for coordinated and scheduled standards-based intervals in network elements. Specifically, the systems and methods include a table or listing of services that are operator configurable with respect to related timers to isolate actions of timed re-optimization, resizing, and reversion events to off peak traffic periods and/or to prioritize actions, where desirable. This provides network operator control, at the network element level and across network elements, over the time of day as well as event temporal stagger of events triggered by a range of uncorrelated standards imposed timers that may impact commercial traffic, network engineering or network performance. The systems and methods can include extending existing time synchronization protocols to synchronize and automatically make predictable the timing of the action of significant timers.

Example Network

Figure 1:
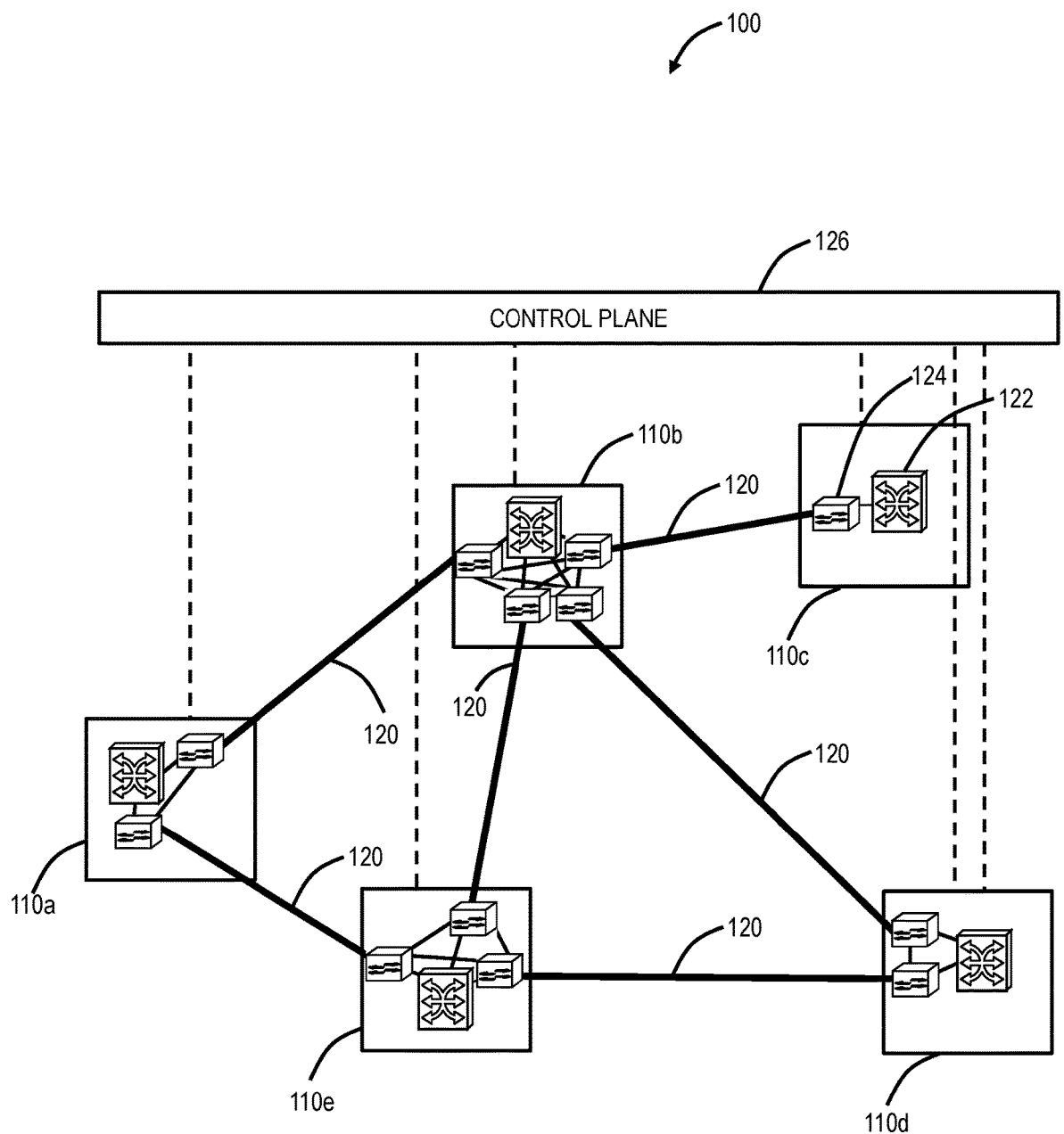
FIG. 1 is a network diagram of an example network with five interconnected sites.

FIG. 1 is a network diagram of an example network 100 with five interconnected sites 110a, 110b, 110c, 110d, 110e. The sites 110 are interconnected by a plurality of links 120. Each of the sites 110 can include a switch 122 (or multiple switches 122) and one or more Wavelength Division Multiplexed (WDM) network elements 124. The switch 122 is configured to provide services at Layer 0 (DWDM, photonic), Layer 1 (e.g., Optical Transport Network (OTN)), Layer 2 (e.g., Ethernet, Multiprotocol Label Switching (MPLS)), and/or Layer 3 (e.g., Internet Protocol (IP)). The WDM network elements 124 provide the photonic layer (i.e., Layer 0) and various functionality associated therewith (e.g., multiplexing, amplification, optical routing, wavelength conversion/regeneration, local add/drop, etc.). Of note, while shown separately, those of ordinary skill in the art would understand the switch 122 and the WDM network elements 124 may be realized in the same network element or each in multiple network elements. The photonic layer can also include intermediate amplifiers and/or regenerators on the links 120 which are omitted for illustration purposes. The network 100 is illustrated, for example, as an interconnected mesh network, and those of ordinary skill in the art will recognize the network 100 can include other architectures, with additional sites 110 or with fewer sites 110, with additional network elements and hardware, different interconnection topologies, etc.

The network 100 can include a control plane 126 operating on and/or between the switches 122 and/or the WDM network elements 124 at the sites 110a, 110b, 110c, 110d, 110e. The control plane 126 includes software, processes, algorithms, etc. that control configurable features of the network 100, such as automating discovery of the switches 122, the capacity of the links 120, port availability on the switches 122, connectivity between ports; dissemination of topology and bandwidth information between the switches 122; calculation and creation of paths for connections; network level protection and restoration; and the like. In an embodiment, the control plane 126 can utilize Automatically Switched Optical Network (ASON), Generalized Multiprotocol Label Switching (GMPLS), Optical Signal and Routing Protocol (OSRP) (from Ciena Corporation), or the like. Those of ordinary skill in the art will recognize the network 100 and the control plane 126 can utilize any type control plane for controlling the switches 122 and/or the WDM network elements 124, and for establishing connections.

Networks at various layers (e.g., Dense Wavelength Division Multiplexed (DWDM), Optical Transport Network (OTN), Ethernet, and the like) are deploying control plane systems and methods. Control planes provide automatic allocation and management of network resources in an end-to-end manner. Example control planes may include Automatically Switched Optical Network (ASON) as defined in ITU-T G.8080/Y.1304, Architecture for the automatically switched optical network (ASON) (February 2005), the contents of which are herein incorporated by reference; Generalized Multi-Protocol Label Switching (GMPLS) Architecture as defined in IETF Request for Comments (RFC): 3945 (October 2004) and the like, the contents of which are herein incorporated by reference; Optical Signaling and Routing Protocol (OSRP) from Ciena Corporation which is an optical signaling and routing protocol similar to PNNI (Private Network-to-Network Interface) and MPLS; or any other type control plane for controlling network elements at multiple layers, and establishing connections therebetween. Control planes are configured to establish end-to-end signaled connections such as Subnetwork Connections (SNCs) in ASON or OSRP, and Label Switched Paths (LSPs) in GMPLS and MPLS. Control planes are configured to compute paths, to route/signal the SNCs/LSPs, and program the underlying hardware accordingly.

Example Network Element/Node

Figure 2:
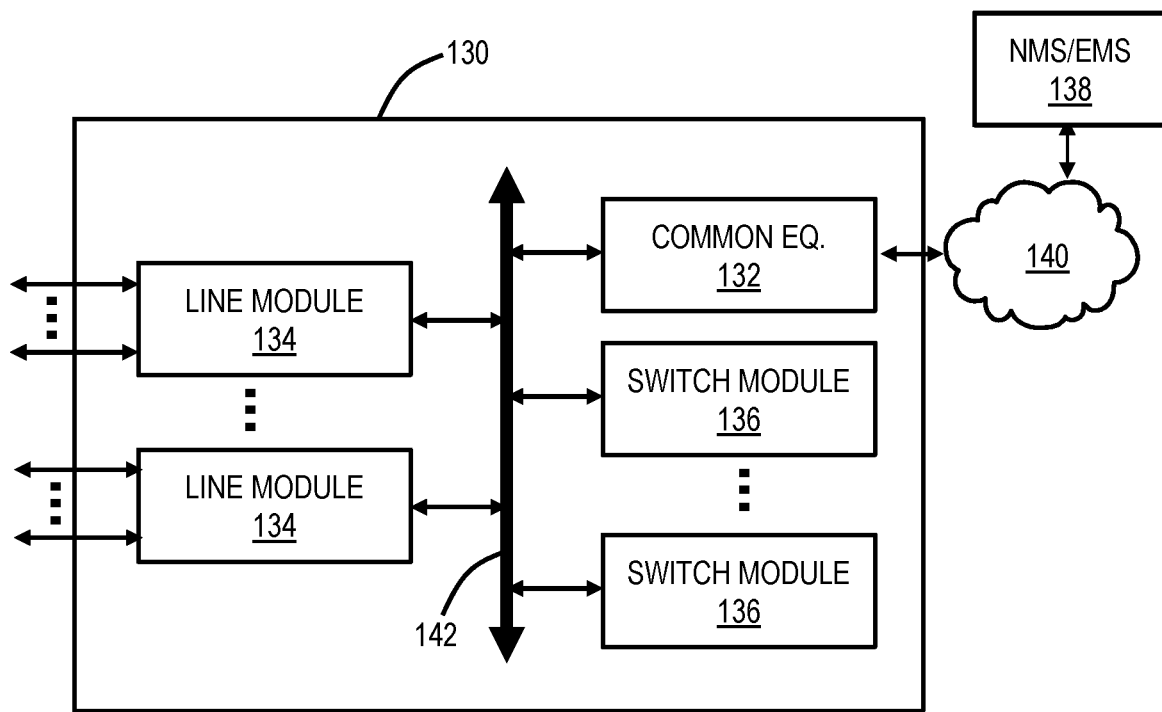
FIG. 2 is a block diagram of a network element for implementing the systems and methods described herein.

FIG. 2 is a block diagram of a network element 130 for implementing the systems and methods described herein. The network element 130 can be the switch 122, the WDM network element 124, or the like. In an embodiment, the network element 130 can be a node that may consolidate the functionality of a Multi-Service Provisioning Platform (MSPP), Digital Cross-Connect (DCS), Ethernet and/or Optical Transport Network (OTN) switch, Wave Division Multiplexed (WDM)/Dense WDM (DWDM) platform, Packet Optical Transport System (POTS), etc. into a single, high-capacity intelligent switching system providing Layer 0, 1, 2, and/or 3 consolidation. In another embodiment, the network element 130 can be any of an OTN Add/Drop Multiplexer (ADM), a Multi-Service Provisioning Platform (MSPP), a Digital Cross-Connect (DCS), an optical cross-connect, a POTS, an optical switch, a router, a switch, a Wavelength Division Multiplexing (WDM) terminal, an access/aggregation device, etc. That is, the network element 130 can be a system with ingress and egress digital signals and switching of channels, timeslots, tributary units, etc. Also, the network element 130 can be a system with ingress and egress of optical signals and switching/routing of wavelengths. Of course, the network element 130 can combine both digital signals and optical signals. While the network element 130 is generally shown as an optical network element, the systems and methods contemplated for use with any switching fabric, network element, or control plane based thereon.

The network element 130 can include common equipment 132, one or more line modules 134, and one or more switch modules 136. The common equipment 132 can include power; a control module; Operations, Administration, Maintenance, and Provisioning (OAM&P) access; user interface ports; and the like. The common equipment 132 can connect to a management system 138 through a data communication network (DCN) 140 (as well as a Path Computation Element (PCE), Software Defined Networking (SDN) controller, OpenFlow controller, etc.). The management system 138 can include a Network Management System (NMS), Element Management System (EMS), or the like. Additionally, the common equipment 132 can include a control plane processor, such as a controller 150 illustrated in FIG. 3 configured to operate the control plane as described herein. The network element 130 can include an interface 142 for communicatively coupling the common equipment 132, the line modules 134, and the switch modules 136 to one another. For example, the interface 142 can be a backplane, midplane, a bus, optical or electrical connectors, or the like. The line modules 134 are configured to provide ingress and egress to the switch modules 136 and to external connections on the links to/from the network element 130. In an embodiment, the line modules 134 can form ingress and egress switches with the switch modules 136 as center stage switches for a three-stage switch, e.g., a three-stage Clos switch. Other configurations and/or architectures are also contemplated.

The line modules 134 can include optical transceivers, such as, for example, 1 Gb/s (GbE PHY), 2.5 GB/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), ODUflex, OTUCn, Flexible Ethernet, etc. Further, the line modules 134 can include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s, N×1.25 Gb/s, and any rate in between as well as future higher rates. The line modules 134 can include wavelength division multiplexing interfaces, short reach interfaces, and the like, and can connect to other line modules 134 on remote network elements, end clients, edge routers, and the like, e.g., forming connections on the links in the network 100. From a logical perspective, the line modules 134 provide ingress and egress ports to the network element 130, and each line module 134 can include one or more physical ports. The switch modules 136 are configured to switch channels, timeslots, tributary units, packets, etc. between the line modules 134. For example, the switch modules 136 can provide wavelength granularity (Layer 0 switching); OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), etc.; Ethernet granularity; and the like. Specifically, the switch modules 136 can include Time Division Multiplexed (TDM) (i.e., circuit switching) and/or packet switching engines. The switch modules 136 can include redundancy as well, such as 1:1, 1:N, etc.

Those of ordinary skill in the art will recognize the network element 130 can include other components which are omitted for illustration purposes, and that the systems and methods described herein are contemplated for use with a plurality of different network elements with the network element 130 presented as an example of a type of network element. For example, in another embodiment, the network element 130 may not include the switch modules 316, but rather have the corresponding functionality in the line modules 134 (or some equivalent) in a distributed fashion. For the network element 130, other architectures providing ingress, egress, and switching are also contemplated for the systems and methods described herein. In general, the systems and methods described herein contemplate use with any network element providing switching of channels, timeslots, tributary units, wavelengths, etc. Furthermore, the network element 130 is merely presented as one example for the systems and methods described herein.

Controller

Figure 3:
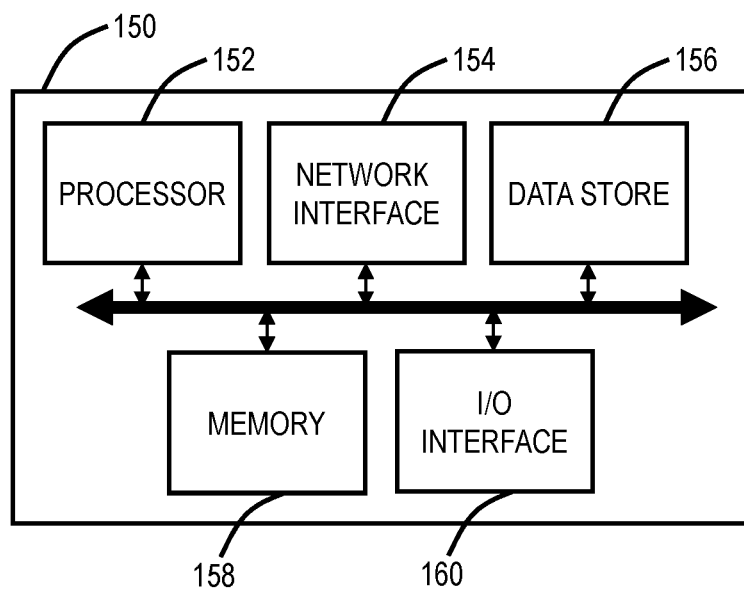
FIG. 3 is a block diagram of a controller to provide control plane processing and/or OAM&P for the network element.

FIG. 3 is a block diagram of a controller 150 to provide control plane processing and/or OAM&P for the network element 130. The controller 150 can be part of the common equipment, such as common equipment 132 in the network element 130, or a stand-alone device communicatively coupled to the network element 130 via the DCN 140. The controller 150 can include a processor 152 which is a hardware device for executing software instructions such as operating the control plane. The processor 152 can be any custom made or commercially available processor, a central processing unit (CPU), an auxiliary processor among several processors associated with the controller 150, a semiconductor-based microprocessor (in the form of a microchip or chip set), or generally any device for executing software instructions. When the controller 150 is in operation, the processor 152 is configured to execute software stored within memory 158, to communicate data to and from memory 158, and to generally control operations of the controller 150 pursuant to the software instructions. The controller 150 can also include a network interface 154, a data store 156, memory 158, an I/O interface 160, and the like, all of which are communicatively coupled to one another and to the processor 152.

The network interface 154 can be used to enable the controller 150 to communicate on the DCN 140, such as to communicate control plane information to other controllers, to the management system 138, to the nodes 130, and the like. The network interface 154 can include address, control, and/or data connections to enable appropriate communications on the network 140. The data store 156 can be used to store data, such as control plane information, provisioning data, OAM&P data, etc. The data store 156 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 156 can incorporate electronic, magnetic, optical, and/or other types of storage media. The memory 158 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 158 may incorporate electronic, magnetic, optical, and/or other types of storage media. Note that the memory 158 can have a distributed architecture, where various components are situated remotely from one another but may be accessed by the processor 152. The I/O interface 160 includes components for the controller 150 to communicate with other devices. Further, the I/O interface 160 includes components for the controller 150 to communicate with the other controllers/nodes, such as using overhead associated with TDM signals.

Standards-Based Timers

As described herein, the network 100 and the associated switches 122, the WDM network elements 124, and the network elements 130 include various standards-based timers which are set for a certain time and for associated actions after the expiry of the time. The foregoing descriptions provide a few illustrative examples of standards-based timers.

Within specific Layer 1 protocols, such as SONET and OTN using the control plane 126 as an example, features such as Time of Day Reversion (TODR) exist whereby a decision is made for a single protocol on a single device to take a hardcoded series of reversion decision actions after the expiry of a timer. For example, an unprotected path can be switched to a sub-optimal path in the event of a fault. When the optimal path (e.g., the "home" path) becomes available, the reversion decision action can be to switch to this path after either the expiry of a Wait to Restore (WTR) timer or based on the TODR schedule. Where multiple connections within the scope of the singular protocol need to be signaled, the signaling can be staggered by a hardcoded value to ensure non-concurrence of the event. A protected path can switch to a backup path and re-signal the primary path across a new path (sub-optimal when compared to the original path). Should the optimal path re-signal and establish with sufficient stability as measured by Bit Error Rate (BER), then switch to the primary path based either on the WTR timer or the TODR schedule.

Consider, as another example, an IETF RFC 4090 (Fast Reroute Extensions to RSVP-TE for LSP Tunnels, May 2005) compliant Fast Reroute (FRR) protected Unidirectional MPLS tunnel with utilization based autosize, with global reversion support, and with LSP reoptimization support. The traffic is sampled at a configurable interval to determine the current size of the tunnel towards determining if a new tunnel size should be signaled using the Resource Reservation Protocol-Traffic Engineering (RSVP-TE) protocol (for the purpose of connection admission control). Should the tunnel support FRR protection and a fault occurs that forces traffic to a facility bypass tunnel, there is a global reversion timer that, upon expiry, triggers the protected tunnel to re-signal across the network and then switch traffic from the facility bypass tunnel to the newly signaled protected tunnel. Should the network conditions change such that a more favorable path for the protected LSP exists, there is an LSP re-optimization timer that, upon expiry, triggers a new LSP to be signaled across the optimal path and then traffic is switched to this new LSP. In this example, there are three concurrent timers for one service on one network element that can independently trigger signaling, re-routing, and traffic switching events. For the event triggered by all timer expires, the assumption is that the network is carrying traffic in a lossless manner but not on optimal routing. The incursion of a traffic hit or re-engineering is desirable, but not urgent, and so should be deferred to non-peak service times.

Consider, as a further example, an ITU-T G.8032 (Ethernet ring protection switching, 08/15) compliant protected Ethernet ring. When a fault occurs on a ring, a sub 50 ms traffic outage is incurred, and MAC learning occurs on all nodes along the new path that is induced by the position of a loop preventing channel block moving from a pre-configured default position to the location of the fault. When the fault recovers, the ring will revert to the original path, and MAC learning will re-occur, where the channel block moves to the originally configured position. This reversion incurs a sub 50 ms traffic hit and occurs after the expiry of a reversion hold-off timer. The reversion hold-off timer is tracked per ring. Prior to reversion, traffic is successfully carried over a secondary path around the ring, making reversion desirable but not critical.

Those of ordinary skill in the art will recognize there are various other standards-based timers which are contemplated for management and coordination with the systems and methods described herein.

Again, conventionally, the actions triggered by a range of standards imposed timers are assumed to be statistically distributed and sparse such that each imposes minimal traffic and performance impact to current deployments. However, as the network 100 scales, these conventional assumptions are no longer valid or predictable. Thus, the systems and methods enable scheduling implementations to control and coordinate when the actions associated with the expiry of standards-based timers should occur where these actions would incur additional traffic, network engineering, or network performance impact. The systems and methods also operate across multiple nodes and across multiple protocol layers to take into account the relative priority of events and to give the operator control over the stagger and execution priority between actions associated with the expiry of standards-based timers.

Also, the conventional approach maximally schedules the action of a single protocol and imposes the control of concurrency only at a nodal level with protocol specific hardcoded or pseudo-random stagger parameters. The objective of the systems and methods is to provide the operator with sufficient control over the actions associated with timer expiry in an environment of multiple concurrent/dependent/layered technologies and a large number of network elements.

The systems and methods provide a single point of event control that includes all protocol layers and timer based events that operate on a single network element. For example, on a core packet networking node, there may be nodal timers related to the layer 0 (photonic) plane, to the layer 1 (OTN) plane, and to the layer 2 (MPLS) plane. It is valuable to prioritize the action of timer driven events at one layer (often the lowest layer) via shorter scheduled windows for execution, as other layer events may become redundant or obsolete by execution of related events at a different protocol layer. Conversely, where all protocol layers concurrently offer events that are service impacting, it may be desirable to bundle these events into a commonly scheduled maintenance window. Coordination of timer events across protocol layers implemented upon the same network element is described herein.

The systems and methods can include a configurable mechanism via an Application Programming Interface (API) to enable control of events across one or more protocol layers and timer based events that occur across multiple nodes participating in a common solution/network. Operator control is provided over an intra event stagger at both a nodal level and at a network level. This gives the operator control over the stagger delay and, therefore, enables engineering of event stagger across technologies (e.g., Link Aggregation Group (LAG), G.8032, MPLS), across protocol layers (e.g., Layer 0, Layer 1, Layer 2, etc.), and across nodes (access nodes, aggregation nodes, core nodes) within a network. As a result, there is control to mitigate the bulk of concurrent service impacting events from occurring.

Operator Control of Timers

The systems and methods include the scheduling of timer expiry events within network elements 122, 124, 130 and across the network elements 122, 124, 130. This ensures that a bulk of network events resulting from timer expiry do not occur concurrently, controls whether network events resulting from timer expiry occur during peak traffic hours, and addresses the so far unrealized assumption that orchestration will manage the coordination of network events that occur upon timer expires.

That is, the systems and methods provide operators granular control over the time of day when network events may trigger for various standards-based timed network event triggers. It also controls the stagger of events so that they do not occur simultaneously at a network element level or at a network level. It further seeks to offload some of the manual aspects of this control by extending existing time synchronization to synchronize the countdown of multiple timers across a large cross-section of services and nodes.

Figure 4:
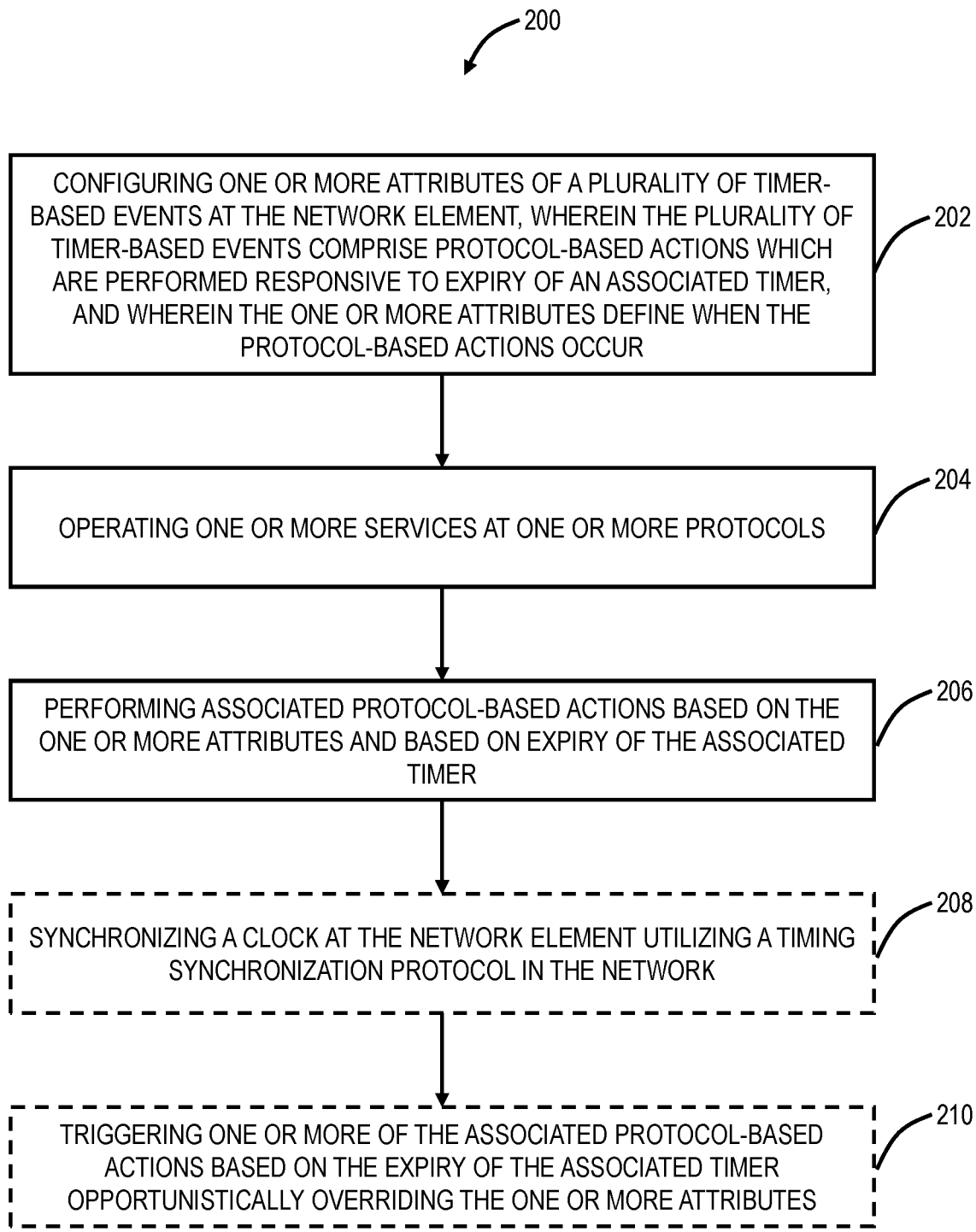
FIG. 4 is a flowchart of a process of coordinating and scheduling intervals in a network element in a network.

FIG. 4 is a flowchart of a process 200 of coordinating and scheduling intervals in a network element in a network. The process 200 is implemented in any of the switch 122, the WDM network element 124, and/or the network element 130. The process 200 includes configuring one or more attributes of a plurality of timer-based events at the network element, wherein the plurality of timer-based events include protocol-based actions which are performed responsive to expiry of an associated timer, and wherein the one or more attributes define when the protocol-based actions occur (step 202).

The process 200 further includes operating one or more services at one or more protocols (step 204). The one or more services can be photonic, TDM, and/or packet services. For example, the one or more services can be SNCs, LSPs, etc. The protocols can include any of photonic, Time Division Multiplexed (TDM), and packet protocols, e.g., WDM, OTN, SONET, SDH, Ethernet, MPLS, etc. The protocols can also include different protocols within Ethernet such as G.8032, Synchronous Ethernet, Precision Time Protocol (PTP, i.e., IEEE 1588), Link Aggregation Group (LAG), etc.

The process 200 further includes performing associated protocol-based actions based on the one or more attributes and based on expiry of the associated timer (step 206). The protocol-based actions can include re-optimization events, resizing events, and reversion events. The process 200 can further include synchronizing a clock at the network element utilizing a timing synchronization protocol in the network (step 208). The timing synchronization protocol can include PTP, Network Time Protocol (NTP), such that longer timed timers can be synchronized throughout the network.

The one or more attributes define the time of day when the protocol-based actions occur. The one or more attributes can further define event temporal stagger between uncorrelated protocol-based actions between different protocols. The one or more attributes can constrain an associated protocol-based action unless associated timers have expired for all services with a common group variable and a current time is within the time window within which the associated protocol-based action may occur.

The one or more attributes can define a grouping of different timers required to expire before an associated protocol-based action can occur. The grouping can further define a staggered time to prevent multiple events occurring concurrently or close to one another. The process 200 can further include triggering one or more of the associated protocol-based actions based on the expiry of the associated timer opportunistically overriding the one or more attributes (step 210). The configuring step 202 can be via a table including the plurality of timer-based events with associated protocol-based actions and associated one or more attributes. The configuring step 202 can be performed by an operator via any of a management system, a control plane, and an orchestrator.

In another embodiment, a network element in a network configured to coordinate and schedule intervals includes one or more ports configured to operate one or more services at one or more protocols; and a controller communicatively coupled to the one or more ports, wherein the controller is configured to configure one or more attributes of a plurality of timer-based events, wherein the plurality of timer-based events include protocol-based actions which are performed responsive to expiry of an associated timer, and wherein the one or more attributes define when the protocol-based actions occur, and cause performance of associated protocol-based actions based on the one or more attributes and based on expiry of the associated timer.

In a further embodiment, a management system configured to coordinate and schedule intervals in a network element in a network includes a network interface communicatively coupled to the network element; a processor communicatively coupled to the network interface; a memory storing instructions that, when executed, cause the processor to receive one or more attributes of a plurality of timer-based events at the network element, wherein the plurality of timer-based events include protocol-based actions which are performed responsive to expiry of an associated timer, and wherein the one or more attributes define when the protocol-based actions occur, provide the one or more attributes to the network element, and cause configuration of the network element for operation of one or more services at one or more protocols and for the performance of associated protocol-based actions based on the one or more attributes and based on expiry of the associated timer.

Service Table

The process 200 includes configuring the plurality of timer-based events at the network element. This configuration can be tracked as a data structure at each network element, such as a table. Those of ordinary skill in the art will recognize any data structure or object is contemplated, and the foregoing descriptions of a table are for illustration purposes.

Each network element can contain a configurable table that includes some or all timer based events at all protocol layers that exist within the entire network element. The configurable event scheduling and event stagger parameters are agnostic to the protocol\service event line item are not left to protocol specific or hardcoded values for any protocol or service. That is, the configurable table presents a unified view of all timer-based events, regardless of protocol.

Of note, the event scheduling is additional to and dependent upon the standards-based timers that trigger events and does not replace the timers proposed by standards/protocols. That is, the process 200 does not replace the standards/protocols. Rather, the process 200 introduces control over when the protocol-based actions occur. The process 200 provides configurable control of events at various protocol layers at a network element level for coordination across multiple network elements. The process 200 provides a central point of configurable control over all network element hosted events and enables prioritization of events across network elements and protocol layers by scheduling or triggering certain events more frequently/regularly than other events. Also, the configurable stagger per and across network elements provides a level of control over network event concurrency.

The following is an example service table:

| Service Table | | | | | | |
|---|---|---|---|---|---|---|
| Service Name | Type | Timer | Countdown | Window | Force Switch | Group |
| LSP Re-opt Tunnel | MPLS | 24 h | 3 h 2 min 5 s | Maintenance | True | A |
| LSP Autosize Tunnel | MPLS | 10 m | Expired | Maintenance | True | A |
| LSP Revert Tunnel | MPLS | 30 s | 10 s | Not configured | False | A |
| G.8032 Holdoff | G.8032 | 10 m | Expired | Weekend | True | none |
| SyncE Reversion | Timing | 2 m | 30 s | Weekend | True | none |
| 1588v2 Reversion | Timing | 10 m | 3 m | Maintenance | True | none |
| LAG Reversion | LAG | 2 m | 30 s | Not configured | False | none |
| L1 CP Revert | OTN | 5 m | Expired | Weekend | True | none |
| L0 CP Revert | Photonic | 5 m | 3 m | Maintenance | True | none |

The following is an example table of the windows in the service table:

| Trigger Time Window Table | | | |
|---|---|---|---|
| Window Name | Start | End | Stagger |
| Maintenance | Daily 12:00:00 | Daily 03:00:00 | 00:00:05 |
| Weekend | Sat 12:00:00 | Sun 23:59:59 | 00:00:05 |

The service table is per network element and includes a table of services at various protocol layers. Again, the services or protocols can include photonic paths, OTN SNCs, MPLS Tunnels, G.8032 Ethernet rings, LAGs, etc. The service table enables configuration of related timers, the time window within which the network event resulting from timer expiry may occur including a staggered time between each network event, and a force switch parameter that indicates whether the service/timer should be subject to the configurable maintenance window or whether it should trigger immediately per the original standard. The service table can also include a grouping symbol for all timers that must all have expired before any action is taken. The table can also include a view of the current timer value. In an embodiment, rows in both tables can be added, deleted, and modified by Command Line Interface (CLI) commands per network element.

Referring to the service table, an LSP Re-opt tunnel determines whether a more optimal path can be found for an LSP. In this example, the timer is 24 hours and has a bit more than 3 hours remaining. The configuration enforces the protocol-based action (moving the LSP to a more optimal path) is only performed in the maintenance window and when the other MPLS timers have expired.

An LSP autosize tunnel determines whether an LSP should resize for bandwidth. In this example, the timer is set every 10 m and is currently expired. The configuration enforces the protocol-based action (resizing the current tunnel) is only performed in the maintenance window and when the other MPLS timers have expired.

As LSP revert timer determines a wait period before an LSP can revert to a primary path. If during this time, the primary path experiences any connectivity problem or stability problem, the timer is restarted. The configuration does not require the reversion to be in any particular time period, but rather upon expiration of the timer. However, this revert timer is grouped with the other MPLS timers, requiring all to be expired before reversion.

G.8032 holdoff determines a holdoff period prior to replacing a ring block. In this example, the timer is set to 10 m and is currently expired. The configuration enforces the protocol-based action (moving the ring block) is only performed in the weekend window.

SyncE (Synchronous Ethernet) reversion and 1588v2 reversion determine a holdoff time before returning to a primary timing source. These timers are set for 2 m and 10 m, respectively. SyncE reversion is constrained to the weekend, and 1588v2 reversion is constrained to a maintenance window.

LAG reversion determines when a port should revert after a switchover. This timer is set for 2 m with 30 s left. LAG reversion is not configured and therefore occurs at the expiry of the timer.

L1 Control Plane (CP) revert and L0 CP revert determine when connections at these layers revert back to a primary path after a switchover. These timers are set for 5 m each. L1 reversion is constrained to the weekend whereas L0 reversion is constrained to a maintenance window.

Grouping

The process 200 can include groupings whereby network events are not triggered unless the relevant service-related timer has expired for all services with a common group variable and the current system time is within the time window within which the network event resulting from timer expiry may occur. The assumption here is that the time of day on network elements is accurate and synchronized to a credible time source by techniques such as Network Time Protocol (NTP) or Precision Timing Protocol (PTP).

The following is a formula that would be applied to each applicable service based on different events occurring:

--- c = current time
s0 = start of the scheduled window
s1 = end of the scheduled window
G= Grouping Variable from Column Grp (example: grouped by letters A-Z or "none" if not a grouped service
Event: Event Time Expiry (Countdown = expired);
If G ! = none
   If ( c >= s0 ) AND ( c < s1 )
      then Trigger event for all G if all services labelled G are ready for event
      else Mark service as ready for event
   If G = none
      If ( c >= s0 ) AND ( c < s1 )
         then Trigger event
         else Mark service as ready for event
   Event: Start of Scheduled Window; c == s0
If G ! = none
If ( ready for event) for all services labelled G
   then Trigger event
If G = none
If ( ready for event)
   then Trigger event

---

A ready for event bit (or some other data structure) could track which services are ready for event trigger at the next window or would be enabled now based the forced switch trigger. This could be reflected in the service table by the assertion of "Expired" in the "Countdown" column.

For example, should the traffic levels on an LSP change and the LSP autosize is triggered due to the expiry of the 10 minute LSP auto size timer, the LSP re-signaling event will only trigger if the time of day is between midnight and 3 am daily due to the application of the Time window called "Maintenance." This would be to constrain re-signaling and traffic impacting events that could apply to a large number of Hosted LSPs to the daily low peak traffic time. The grouping variable impact is such that the event will occur only if LSP Re-opt tunnel and LSP Revert tunnel timers have expired.

Stagger

The process 200 can include a staggered time between each network event to reduce network stress related to all events occurring concurrently or very close together. For example in the service table, all services with "Force Switch" flag set to true and "Window" set to "Maintenance" would trigger only between the hours of midnight and 3 am daily and would be spaced by an interval of 5 seconds due to a "Stagger" setting of 5 s. This would be to protect both the network element and the network from an instantaneous burst of MPLS signaling events where there may be hundreds of LSPs hosted upon on the network element.

Opportunistic Override

The process 200 can include a function whereby all events where the relevant service related timer has expired can be triggered to as soon as possible with the stagger timer in place. This allows the operator the flexibility to opportunistically trigger network repair and re-optimization events in a controlled cleanup window of time that may not coincide with the regularly scheduled Timer Trigger Window.

For example, since the table indicates that the countdown for services "LSP AutoSize Tunnel" and "G.8032 Hold-off" have expired, a command is provided to trigger the service event (G.8032 revertive switch) for the particular service immediately (example service-timer service G.8032 Hold-off trigger now) would trigger the G.8032 revertive switch regardless of the configured time of day window. Similarly, commands are provided to trigger the event associated with all expired countdowns (service-timer countdown all-expired trigger now, which would trigger an LSP auto-size re-signaling and a G.8032 revertive switch, with all expired countdowns for a specific window (e.g., Maintenance) (service-timer window Maintenance trigger now etc.) which would only trigger LSP-re-optimization on tunnel A since the G.8032 hold-off timer belongs to the "Weekend" window and not the "Maintenance" window.

Force Switch

The process 200 can include a Force switch flag for each service. Should the operator wish to not subject a service to timer scheduling, this value should be set to "False" as it is for "LSP Revert Tunnel" and "LAG Reversion" in the example service table. For example, this means that LSP Tunnel would be subject to global reversion as soon as the 30 second timer expires and LAG would switch back to primary from backup as soon as the 2 minute reversion hold off timer expires.

Timing Synchronization

The process 200 can use the NTP or PTP protocols to enable a network level of control such that all nodes in the network synchronize to the same timer countdown. This is useful towards having a highly accurate timer baseline across a large number of nodes/services thereby, in addition to making the action of shorter timers schedule, making the timer expiry of longer timers predictable and engineerable.

An additional information element in the PTP and/or NTP protocols can trigger the synchronization of timer countdowns in the network. For example, the information element could contain a list of NTP/PTP client IP addresses, the name of a service, and the desired countdown. If the name of the service was not included, then no countdown is adjusted. Where the countdown adjustment is desired, the desired countdown that accompanies the name of the service in the new protocol is adjusted on all nodes for which the NTP/PTP client is in the list of NTP/PTP client IP addresses.

Management Protocols

The configuring step 202 in the process 200 can be performed using various management devices and protocols. For example, a set extension to SNMP and/or an extension to NetconfWANG can be included to execute on multiple nodes from a management/orchestration station. This is to give operator temporally opportunistic control to trigger the functions across a large cross-section of nodes and services.

An SNMP set or a Netconf config statement can trigger functions across a selectable set of network elements. For example, where LSP re-optimization may be desired at a Label Edge Router (LER) terminating a large number of tunnels, the operator can enable the immediate optimization trigger across the hosting LER and the numerous LERs are hosting the far side of the unidirectional or bidirectional tunnels.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having a computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, the software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable storage medium having computer readable code stored thereon for programming a device to perform steps of:
   for a plurality of services operating on a plurality of network elements in a network, determining attributes for a plurality of timer-based events that periodically occur; and
   providing a configuration based on the determined attributes to the plurality of network elements for configuring the associated network elements, wherein the configuration controls and coordinates when protocol-based actions associated with the plurality of timer-based events occur, across the plurality of network elements and across one or more protocol layers,
   wherein the attributed define when corresponding protocol-based actions occur.

2. The non-transitory computer-readable storage medium of claim 1, wherein the protocol-based actions include re-optimization, resizing, and reversion.

3. The non-transitory computer-readable storage medium of claim 1, wherein the configuration includes conditions used to control the protocol-based actions for each of the plurality of timer-based events.

4. The non-transitory computer-readable storage medium of claim 3, wherein the protocol-based actions are constrained based on associated conditions.

5. The non-transitory computer-readable storage medium of claim 1, wherein the configuration staggers the protocol-based actions throughout the network.

6. The non-transitory computer-readable storage medium of claim 1, wherein the configuration isolates the protocol-based actions throughout the network to specific time periods.

7. The non-transitory computer-readable storage medium of claim 1, wherein the services include any of Multiprotocol Label Switched (MPLS) tunnels, G.8032 rings, Link Aggregation Groups (LAGs), and Optical Transport Network (OTN).

8. The non-transitory computer-readable storage medium of claim 1, wherein the services are across both optical and packet layers.

9. A management system configured to coordinate and schedule intervals in a network element in a network, the management system comprising:
   a network interface communicatively coupled to the network element;
   a processor communicatively coupled to the network interface;
   memory storing instructions that, when executed, cause the processor to
      for a plurality of services operating on a plurality of network elements in a network, determine attributes for a plurality of timer-based events that periodically occur, and
      provide a configuration based on the determined attributes to the plurality of network elements for configuring the associated network elements, wherein the configuration controls and coordinates when protocol-based actions associated with the plurality of timer-based events occur, across the plurality of network elements and across one or more protocol layers,
      wherein the attributes define when corresponding protocol-based actions occur.

10. The management system of claim 9, wherein the protocol-based actions include re-optimization, resizing, and reversion.

11. The management system of claim 9, wherein the configuration includes conditions used to control the protocol-based actions for each of the plurality of timer-based events.

12. The management system of claim 11, wherein the protocol-based actions are constrained based on associated conditions.

13. The management system of claim 9, wherein the configuration staggers the protocol-based actions throughout the network.

14. The management system of claim 9, wherein the configuration isolates the protocol-based actions throughout the network to specific time periods.

15. The management system of claim 9, wherein the services include any of Multiprotocol Label Switched (MPLS) tunnels, G.8032 rings, Link Aggregation Groups (LAGs), and Optical Transport Network (OTN).

16. The management system of claim 9, wherein the services are across both optical and packet layers.

17. A method comprising:
for a plurality of services operating on a plurality of network elements in a network, determining attributes for a plurality of timer-based events that periodically occur; and
providing a configuration based on the determined attributes to the plurality of network elements for configuring the associated network elements, wherein the configuration controls and coordinates when protocol-based actions associated with the plurality of timer-based events occur, across the plurality of network elements and across one or more protocol layers,
wherein the attributes define when corresponding protocol-based actions occur.

18. The method of claim 17, wherein the protocol-based actions include re-optimization, resizing, and reversion.

19. The method of claim 17, wherein the configuration includes conditions for each of the plurality of events used to control the protocol-based actions.

20. The method of claim 17, wherein the configuration staggers the protocol-based actions throughout the network.

* * * * *